United States Patent [19]

Hundt et al.

[11] Patent Number: 5,499,303
[45] Date of Patent: Mar. 12, 1996

[54] CORRECTION OF THE GAZE DIRECTION FOR A VIDEOPHONE

[75] Inventors: Eckart Hundt, Haar; Thomas Riegel, Munich; Heinz Schwärtzel, Munich; Manfred Ziegler, Munich, all of Germany

[73] Assignee: Siemens Aktiengesellschaft, Munich, Germany

[21] Appl. No.: 94,171

[22] PCT Filed: Jan. 7, 1992

[86] PCT No.: PCT/DE92/00007

§ 371 Date: Jul. 27, 1993

§ 102(e) Date: Jul. 27, 1993

[87] PCT Pub. No.: WO92/14340

PCT Pub. Date: Aug. 20, 1992

[30] Foreign Application Priority Data

Jan. 31, 1991 [DE] Germany .......................... 41 02 895.3

[51] Int. Cl.[6] ...................................................... G06K 9/00
[52] U.S. Cl. .......................... 382/100; 382/173; 382/293; 348/78
[58] Field of Search ............................... 382/1, 9, 18, 44, 382/45; 348/2, 14, 20, 25, 78; 351/206, 210; H04N 7/14

[56] References Cited

U.S. PATENT DOCUMENTS

| | | | |
|---|---|---|---|
| 4,600,281 | 7/1986 | Bloomstein | 352/50 |
| 4,641,349 | 2/1987 | Flom et al. | 382/2 |
| 4,730,260 | 3/1988 | Mori et al. | 364/518 |
| 4,931,865 | 6/1990 | Scarampi | 358/84 |
| 5,016,282 | 5/1991 | Tomono et al. | 382/2 |
| 5,218,387 | 6/1993 | Ueno et al. | 351/210 |
| 5,280,530 | 1/1994 | Trew et al. | 382/1 |
| 5,386,258 | 1/1995 | Nagano | 354/400 |

FOREIGN PATENT DOCUMENTS

| | | | |
|---|---|---|---|
| 0385128 | 9/1990 | European Pat. Off. | H04N 7/14 |
| 61-65683 | 4/1986 | Japan | H04N 7/14 |
| 61-199178 | 9/1986 | Japan | 382/1 |
| 62-46384 | 2/1987 | Japan | 382/9 |
| 63-142986 | 6/1988 | Japan | H04N 7/14 |
| 63-228890 | 9/1988 | Japan | H04N 7/14 |
| 2-58484 | 2/1990 | Japan | H04N 7/14 |

OTHER PUBLICATIONS

Gonzalez, et al., *Digital Image Processing*, 1992, Addison–Wesley Publishing Company, p. 191.
Translation of Japanese Kokai 62-46384 to Nemoto.
Bildtelefon mit Blickkontakt?–Technische Möglichkeiten und empirische Untersuchungen, Kellner, et al. ntz Bd 38 (1985) pp. 698–703.
Bildtelefon mit virtueller Kamera zur Herstellung des Bllickkontakts j. Liu et al. pp. 650–658. (no date).
The Robust Recognition of Object Primitives Using Local Axes of Symmetry, Seitz, Signal Processing (1989) pp. 89–108 Elservier Science Publishers B.V.
Application of Multi–Layer Perceptrons to Facial Feature Location Hines, et al. University of Warwick, UK and British Telecom Research Laboratories, UK, pp. 39–43 Jul. 1989.
A Feature Tracking Method for Motion Parameter Estimation In A Model–Based Coding Application, Yau, et al. Heriot–Watt University UK. pp. 531–535, Jul. 1989.
Ultraschall–Entfernungsmesser, Elektor Oct. 1988, pp. 31–35 vol. 19, No. 10, German Edition, 1988.
Autofokus: Scharfe Sache, Funkschau 24/1984, pp. 41–43, by Schmidt.

*Primary Examiner*—Leo H. Boudreau
*Assistant Examiner*—Andrew W. Johns
*Attorney, Agent, or Firm*—Hill, Steadman & Simpson

[57] ABSTRACT

A method for correcting the gaze direction of persons in a digital image where an angular error between the gaze direction and the camera axis is determined. The pupils of both eyes in the image are then segmented and displaced within the image plane. Areas which have become free are filled in using the color of the eyeball. Any interfering edges produced are attenuated in a subsequent processing step (e.g., by using a low-pass filter). The method is also applicable for a sequence of images over time.

7 Claims, 4 Drawing Sheets

Pupille
Augenwinkel

_CORRECTION OF THE GAZE DIRECTION FOR A VIDEOPHONE_

BACKGROUND OF THE INVENTION

1. Field of the Invention

The present invention is directed to a method for correcting the gaze direction for a videophone.

2. Description of the Prior Art

The 'videophoning' service is increasingly significant in the field of new telecommunication services. In forecasts for the year 2000, is assumed that, following a concentration on the business sector, the majority of broadband ISDN mainlines will be for private subscribers. However, such forecasts are not without contention and presuppose favorable boundary conditions, the question of cost playing an important role in particular.

Apart from low costs, however, the solving various ergonomic problems is also an important condition for acceptance of the videophoning service on the part of private subscribers. Visual contact during videophoning is a significant ergonomic problem.

Along with gestures and facial expression, gaze is one of the most important aspects of man's non-verbal behavior. Many sociopsychological studies attest to the importance of the gaze direction and visual contact as communicative signals (A. Kendon; "Some Functions of Gaze Direction in Social Interaction", Acta Psychologica 26 (1967), pages 1 to 47). In the case of conventional videophone terminals, the geometry of the arrangement of camera, monitor and user causes an angular error α between the gaze direction towards the monitor and the camera axis, so that true visual contact in the sense of the two parties to the call "looking each other in the eye" is not possible. Thus, in the case of an arrangement according to FIG. 1, there would be the impression that the other party is always looking slightly to the This effect becomes more pronounced at close distances between the user and the terminal. This deviation true visual contact may have the effect in videophone calls of reducing or falsifying the communicative signals of gaze direction and visual contact. However, various technical devices can permit visual contact for a videophone.

In the technical production of a videophone terminal without angular gaze error, a correction of the gaze direction can in principle be achieved by various processes (B. Kellner et al., "Bildtelefon mit Blickkontakt?" (Videophone with Visual Contact?), NTZ Vol. 38 (1985) Issue 10) which follow.

A) Use of a fixed beam splitter between camera and monitor.

A partially transparent mirror is fitted in front of the monitor in such a way that the viewer can see the monitor image through the mirror, although with reduced brightness. By means of this mirror, the camera can pick up the viewer from the direction of the monitor, permitting recording and reproduction over one axis (axis of convergence).

B) Time-division multiplexing of recording and reproduction.

Reproduction of the image of the other party is undertaken by a video projector on a projection screen. The camera is located behind the projection screen and can pick up the viewer through a window provided with a light valve.

C) Space-division multiplexing of recording and reproduction.

Reproduction of the image of the other party is performed by means of a video projector on a partially transparent projection screen having a reflective grid structure. The camera can pick up the subscriber at the true angle of gaze through the transparent structure of the projection screen; the range of contrast of recording and reproduction is reduced.

D) Simulation of an image recording in the axis of convergence.

Reproduction of the image of the other party is undertaken by a monitor, as in the case of a conventional videophone. The viewer is recorded by means of a number of cameras from various angles of gaze at the edge of the monitor. A videoprocessor is used to calculate from the individual part-images an page which permits visual contact (J. Liu and R. Skerjanc, "Bildtelefon mit virtueller Kamera zur Herstellung des Blickkontaktes" (Videophone with Virtual Camera for Establishing Visual Contact), 12th DAGM Symposium, Oberkochen-Aalen, 1990).

Of the known processes (A–D), so far only process A with partially transparent mirrors as a fixed beam splitter has been produced. The other processes have so far not been put into practice owing to technological problems in producing a suitable light valve (B) or the projection screen with grid structure (C). In the case of process (D), it must first of all be checked whether the calculated image of a camera imagined to be in the center can represent the conditions for visual contacts sufficiently accurately. Only when the necessary computing operations are known can it be estimated to what extent calculation in real time is possible with reasonable expenditure.

All the processes specified (A to D) require considerable expenditure to make visual contact possible for a videophone, which could prevent this technology from becoming established on the market. Putting the said processes into practice requires large devices with high costs to produce poor quality images on the recording side and the reproduction side.

SUMMARY OF THE INVENTION

It is an object of the present invention to provide a method of the type initially cited that avoids the problems of current methods in an economical manner.

In the process, the pupils and eyeballs of a depicted person in the image plane are segmented. The segments corresponding to the pupils are displaced in the image plane, and areas which become free are filled in using the color of the eyeballs. In this way, a synthetic image of the depicted person is created but, in contrast to method (D) known from the literature, is restricted to the eyes of the depicted persons and is based on considerably simplified models. This process is therefore considerably more simple and cost-effective to put into practice than the processes known from the literature.

In the description of the process according to the invention the word pupil is used in a way different from customary linguistic usage to mean the circular area of the eye which is generally darker than the eyeball, but varies in color from person to person, and is composed of the iris and the pupil in the customary sense of the word.

Application of the invention is not restricted only to the area of the videophone. Rather, the process can be applied to all digital images and image sequences in which the gaze direction of a depicted person is of significance. Applications of the process therefore also arise in the case of television, for example for correcting the gaze direction of news broadcasters and speakers.

BRIEF DESCRIPTION OF THE DRAWINGS

The invention shall be set forth in greater detail by way of example with reference to the figures.

DESCRIPTION OF THE PREFERRED EMBODIMENTS

The invention is described in detail below with reference to a preferred exemplary embodiment and with the aid of the Figures.

Figure 1:
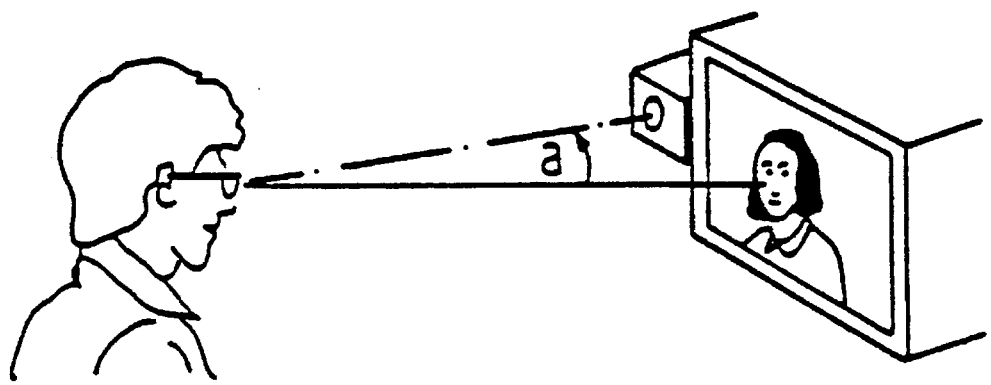
FIG. 1 is a fundamental illustration of the problem on which the invention is based.
Figure 5:
FIG. 5 shows an image in which a person with gaze direction to be corrected can be seen.
Figure 6:
FIG. 6 shows an image in which a person with corrected gaze direction is depicted.

FIG. 1 shows the geometrical relationships in the recording of a person with the aid of a camera beside a monitor. The other party to a call is depicted on the monitor. Since both parties to the call do not look into the camera but at the monitor during the call, an angular viewing error α occurs between the gaze direction and the camera axis. As FIG. 1 reveals, in the case of this arrangement visual contact between the parties to a call is not possible. FIG. 5 shows a person who has been recorded under the conditions in FIG. 1. The depicted person is not looking at the viewer of the image but is looking to the side of the viewer. A process by which the gaze direction of the depicted person is corrected is described below.

At the beginning of the process, generally the position in the image plane of the eyes of a depicted person is completely unknown. Therefore, at the beginning of the process the position in the image plane of the pupils and the eyeballs of a depicted person must be determined. Since the position of the pupils and eyeballs is variable over time, it is generally appropriate, and has considerable concomitant advantages regarding the computational complexity if the position of the pupils and eyeballs is tracked over the course of time by suitable methods. In this way, it is possible to predict the position of the pupils and eyeballs in the image plane for each given point in time from the known positions at earlier points in time. With the aid of such predicted estimated values for the positions, a positional determination is possible at any point in time with considerably reduced expenditure.

Once the position of the pupils and eyeballs for a given image of a sequence of images over time is determined, the image areas associated with the pupils and eyeballs are segmented in the image plane. The segments corresponding to the pupils are then displaced in the image plane. At the same time, areas become free in the area of the eyeballs and are filled in using the color of the eyeballs. To carry out the process, various image processing methods known from the literature are required. The methods are explained below should be known to a person skilled in the art.

For the segmentation of the eye areas, i.e. for determining the positions of pupils and eyeballs, a person skilled in the art has at his disposal a series of known methods to routinely accomplish this task. Examples include the publications by P. Seitz, "The Robust Recognition of Object Primitives Using Local Axes of Symmetry", Signal Processing, Vol. 18, No. 1, pp. 89–108, Sept. 1989 and E. L. Hines and R. A. Hutchinson, "Application of Multi-layer Perceptrons to Facial Feature Location", Third International Conference on Image Processing and its Applications, Warwick, UK; 18th–20th Jul. 1989, pp. 39– 43. In the paper by P. Seitz, Chapter 4 and paragraphs 4 and 5 are particularly of interest in this context. With the methods and processes described in these publications, a determination of the position of pupils and eyeballs is possible without difficulties.

Various processes which can be used routinely for tracking the movement of the positions of pupils and eyeballs likewise exist in the literature. An example is the publication by J. F. S. Yau and N. D. Duffy, "Feature Tracking Method For Motion Parameter Estimation In A Model-Based Application", Third International Conference on Image Processing and its Applications, Warwick, UK; 18th–20th Jul. 1989; pp. 531– 535. With the aid of this or a similar standard tracking process, the changes over time of the position parameters of pupils and eyeballs can be tracked. In addition, a prediction of estimated values of these position parameters is possible with the aid of these methods.

Figure 3A:
FIG. 3a shows an image cutout with a human eye.
Figure 3B:
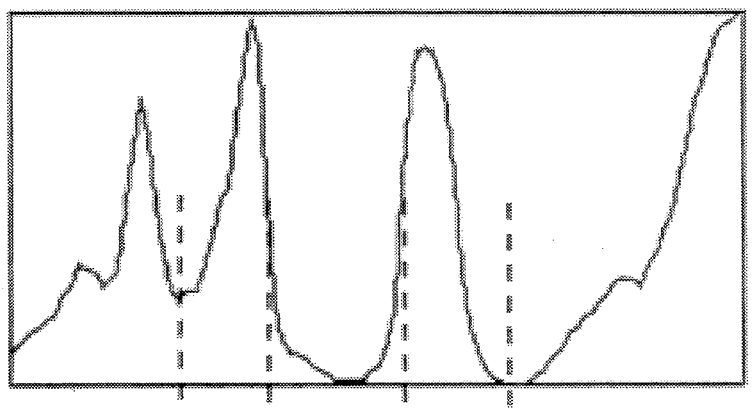
FIG. 3b shows an associated horizontal gray-scale value progression.

Once the position of the pupils and eyeballs has been determined, the pupils and eyeballs must be segmented in the image plane. For this purpose, the edges of the segments corresponding to the pupils and eyeballs have to be determined. They are found, for example, by determining the gray-scale value progression along a straight line in the image plane which crosses through the eye. The pupils themselves correspond to the central minimum of such a gray-scale value progression. The edges of the pupils are consequently obtained with the aid of the points of inflection of this gray-scale value progression which are directly adjacent to the central minimum. The edges of the eyeball correspond to the secondary minima in the gray-scale value progression which are directly neighboring on both sides of the central minimum corresponding to the pupil. The points of inflection and secondary minima of the gray-scale value progression required for determining the edges of the pupils and the edges of the eyeballs can be determined in a simple way with the known gray-scale value progression. For determining the closed bordering curves of the pupils or the eyeballs, the gray-scale value progression along a plurality of straight lines crossing through the eyes can be determined. In this way, exact segmentation of the pupils and of the eyeballs in the image plane is possible. FIG. 3b shows a typical gray-scale value progression along a horizontal straight line through the human eye, which is depicted in FIG. 3a above the gray-scale value progression. As FIG. 3b reveals, a central minimum in the gray-scale value progression corresponds to the pupil, and the points of inflection directly neighboring this central minimum correspond to the edges of the pupils. The edges of the eyeballs correspond to the secondary minima directly neighboring the central minimum on both sides.

Figure 2:
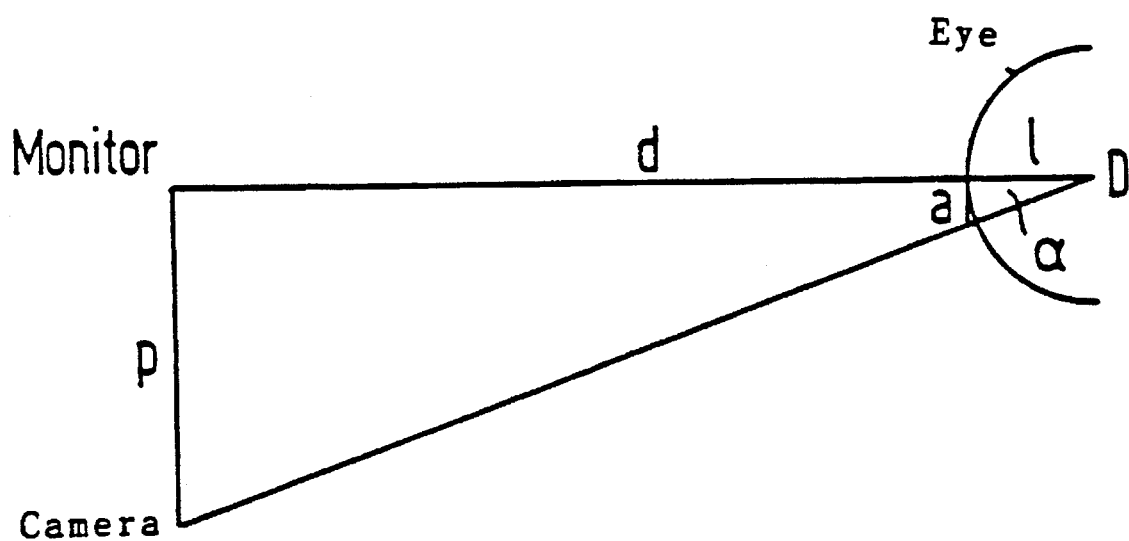
FIG. 2 shows the geometrical relationships in the triangle comprising monitor, camera and eye.
Figure 4:
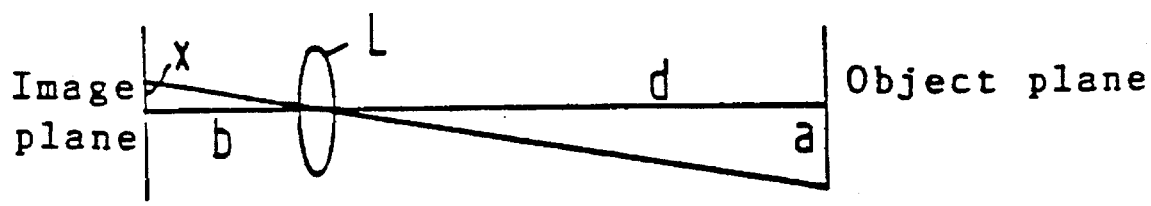
FIG. 4 shows the geometrical relationships in the optical imaging.

Once the pupils and eyeballs have been segmented in the image plane, the actual correcting of the gaze direction follows by displacing the pupil segments in the image plane. FIGS. 2 and 4 show the geometrical relationships. FIG. 2 shows the triangle comprising monitor, camera and the, center of the eye. FIG. 4 shows the optical imaging. As FIG. 2 reveals, according to intercept theorems, the distance d between the center of the eye and the monitor is in the same proportion to the radius of the eye L as the distance p between camera and monitor is in proportion to the real pupil displacement a. The real pupil displacement corresponds to the positional difference of the pupils when changing between the gaze direction from the monitor to the camera. Using as a basis the central projection as a model for the optical imaging (FIG. 4), consequently with given resolution r of the camera (measured in pixels per unit length), the following expression is obtained for the displacement x of the pupils in the image plane:

$$x = \frac{p \cdot L \cdot f \cdot d \cdot r}{d^2 \cdot (d-f)} \text{ pixels}$$

where d denotes the distance between the monitor and the center of the eyeball,

P denotes the distance between monitor and camera,

L denotes the radius of the eyeball, f denotes the focal length of the camera lens and r denotes the resolution of the camera, measured in pixels per unit length.

Apart from the distance d between monitor and the center of the eyeball, all the parameters can be assumed to be known and invariable over time. In the applications in which the monitor distance d is invariable over time, the method can incorporate this as part of the initialization. In other applications, in which the monitor distance is variable over time, this must be continuously measured. Various processes described in the literature are considered for this distance measurement between eye and monitor. Distance measurement by means of ultrasonic range finders or with the aid of focal length variation (depth from focus) are examples. Both methods are familiar to those skilled in the art and can be used routinely. The method of ultrasonic range finding is described, for example, in the journal "Elektor" in the anonymous article "Ultraschall-Entfernungsmesser" (Ultrasonic Range Finders), Vol. 19, No. 10 of the German edition, 1988, on pages 31 to 35. The other process is described by Schmidt and Auer in their article "Autofocus: Scharfe Sache" (Autofocus: An issue in focus), Funkschau, Vol. 56, No. 24, 1984 on pages 41 to 43.

Following the displacement of the pupil segments, the areas which became free during the course of the displacement must be filled in using the color of the eyeball. To eliminate any interfering edges produced after the displacement, in a subsequent processing step a low-pass filter can be used on the altered digital image. This generally allows the elimination of interfering edges, i.e. discontinuity contours in the gray-scale value progression.

In the case of a normal portrait, the eyes generally take up only a very small part of the overall image. As a result, the computational complexity required is low. The process is therefore suitable for execution in real time.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A method for computer based altering a gaze direction of a face represented in a digital image, of a video image sequence describing persons communicating with each other via display while the persons are gazing at a monitor and the video image sequence is taken by a camera and thus an angular viewing error occurs between a person's gaze direction and a camera axis, the method comprising the steps of:

a) segmenting pupils and eyeballs of a depicted face by a computer;

b) displacing resulting segments corresponding to said pupils in an image plane and thereby computationally freeing areas previously occupied by the displaced segments;

c) filling in said areas which become free using color of said eyeballs to provide an image of a face having an altered gaze direction; and d) displaying said image of a face having an altered gaze direction.

2. A method as claimed in claim 1, wherein said segmenting comprises the steps of:

i) determining gray-scale value progressions along straight lines in said image plane;

ii) determining edges of said pupils using points of inflection of said gray-scale value progressions;

iii) determining edges of said eyeball using minima of said gray-scale value progressions.

3. A method as claimed in claim 1, wherein displacement of said pupils in said image plane is represented by x which is a shift of the pupils as measured in pixels given by $$x = \frac{p \cdot L \cdot f \cdot d \cdot r}{d^2 \cdot (d-f)} \text{ pixels}$$

where d denotes distance between a monitor and the center of said eyeball,

P denotes distance between said monitor and a camera,

L denotes the radius of said eyeball, f denotes the focal length of a lens of said camera and r denotes the resolution of said camera, measured in pixels per unit length.

4. A method as claimed in claim 1, further comprising a subsequent processing step of eliminating interfering edges using a low-pass filter.

5. The method as claimed in claim 1, wherein said step of displaying said image is further defined by displaying said image on a videophone.

6. A method for computer based altering a gaze direction of a face represented in a digital image in a video image sequence over time describing persons communicating to each other via display while the persons are gazing at a monitor and the video image sequence is taken by a camera and thus an angular viewing error occurs between a person's gaze direction and a camera axis, the method comprising the steps of:

a) tracking pupils and eyeballs of a depicted face with regard to a change over time of the position of said pupils and eyeballs in an image plane;

b) determining an instantaneous position of said pupils and eyeballs in said image plane using predicted estimated values;

c) computationally segmenting said pupils and eyeballs;

d) displacing resulting segments corresponding to said pupils in said image plane and thereby freeing areas previously occupied by the displaced segments;

e) computationally filling in said areas which become free using color of said eyeballs to provide an image of a face having an altered gaze direction; and f) displaying said image of a face having an altered gaze direction.

7. The method as claimed in claim 6, wherein said step of displaying said image is further defined by displaying said image on a videophone.

* * * * *